Nov. 22, 1938.  E. C. McFARLANE  2,137,248
PLUG VALVE
Filed Dec. 5, 1936  2 Sheets-Sheet 1
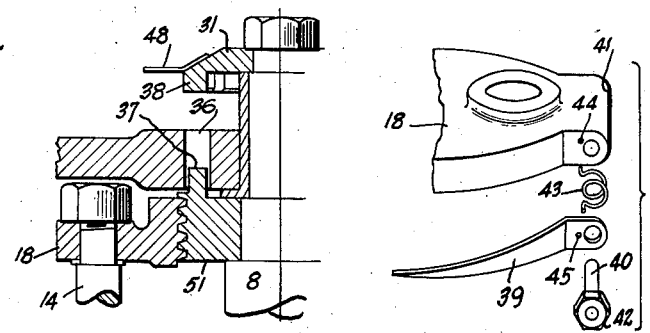
Fig. 5
Fig. 4
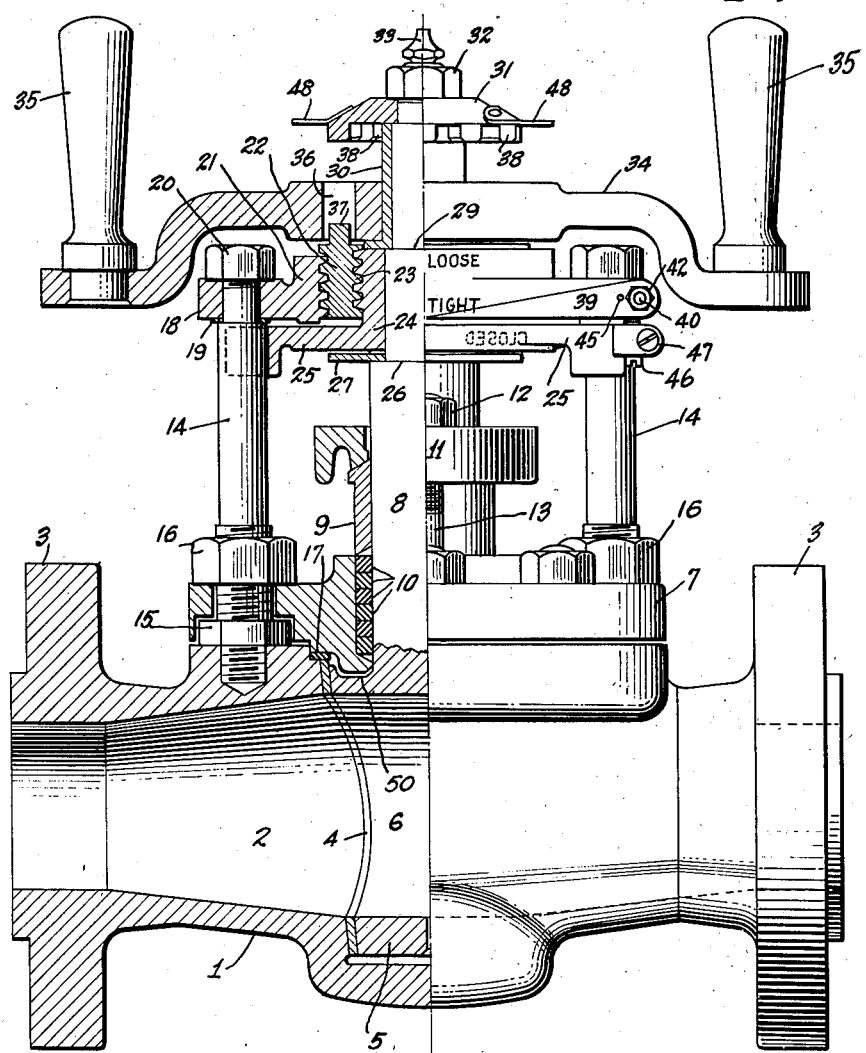
Fig. 1
INVENTOR.
Edwin C. McFarlane
BY
Robert A. Favender
ATTORNEY.

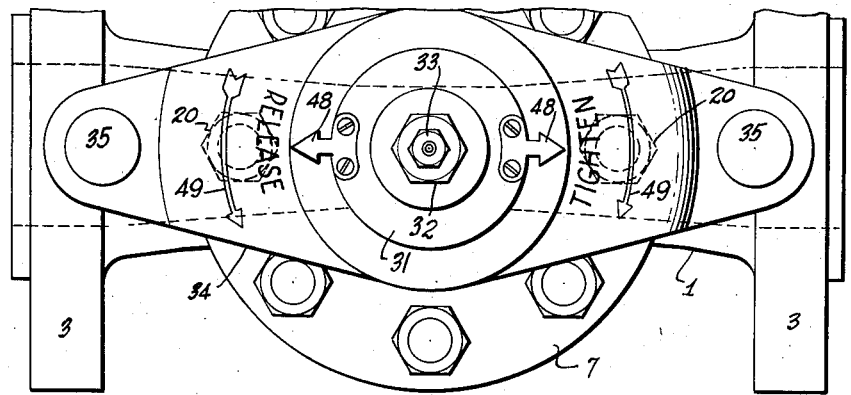
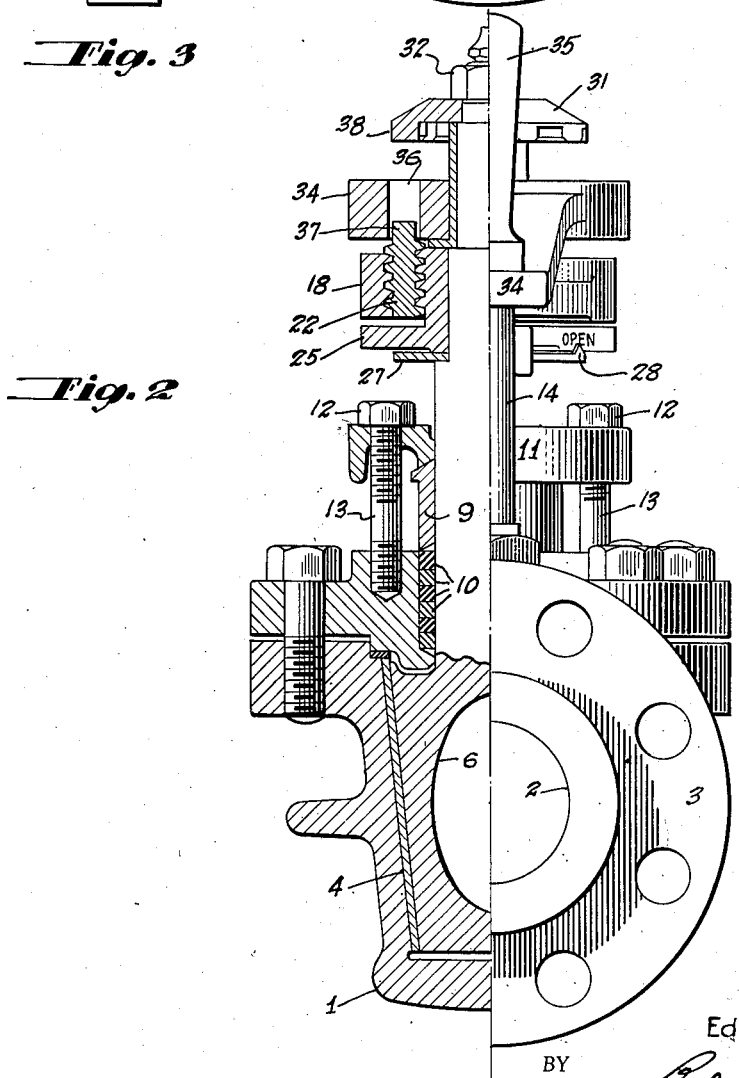

Patented Nov. 22, 1938

2,137,248

UNITED STATES PATENT OFFICE 2,137,248

PLUG VALVE

Edwin C. McFarlane, Pearl River, N. Y.

Application December 5, 1936, Serial No. 114,344

3 Claims. (Cl. 251—97)

(Granted under the act of March 3, 1883, as amended April 30, 1928; 370 O. G. 757)

This invention relates to valves and is directed more particularly to that type of valve wherein the sealing member of the valve is in the form of a frustoconical plug adapted to cooperate with a correspondingly tapered seat in the valve casing. Valves of this kind, sometimes referred to as plug cocks, are used extensively in the arts and are particularly efficient in that they automatically take up wear and serve to maintain a tight fit through long periods. They are, however, open to the objection that the plug of the valve tends to stick or freeze to its seat when left inactive for protracted periods, so as to render the operation of the valve extremely difficult. This objection is widely prevalent in valves of this kind, particularly in view of the fact that, when the valve is employed to control high fluid pressures, the plug must have a tight engagement with its seat, which tends to produce the sticking to which I have referred.

In view of the tendency of these valves to stick, it has been the common practice to make the taper of the plug relatively abrupt, for the finer the taper the greater tendency there is to stick. On the other hand, the finer the taper, the better the valve is able to withstand high gaseous pressures. The fact remains that a valve of this kind having a small taper cannot be satisfactorily operated, so that a greater taper which tends to promote leakage is the common practice.

One object of the present invention is to provide a simple and efficient valve of the character described, so constituted that it may be made with a very fine taper to enable it to properly hold high pressures and yet may be easily operated when desired.

In practically carrying out the present invention, I accomplish this result and others by associating with the valve, means adapted to effect the positive seating or unseating of the plug when desired, so that the plug may be slightly unseated to permit of its rotation and subsequently forced firmly to its seat when in proper adjusted position. All this is accomplished in accordance with the present invention through the manipulation of a single handle or operating member adapted to be bodily shifted into different positions at the will of the operator to render it capable of either seating or unseating the plug or rotating the plug as may be desired.

The practical difficulty with such an arrangement, in a general sense, is that the plug is housed within a casing where its position cannot be observed and consequently the present invention embodies also indicating devices which accurately show whether the plug is fully seated or not and also the position of the port through the valve plug, so that the operator, by reference to these indicating devices, cannot inadvertently leave the valve in a condition other than that desired. In this respect the valve of the present invention is absolutely safe and there can be no doubt at any time as to the position of the plug thereof.

Another object of the invention is to so constitute the valve that the packing thereof may be changed without shutting down the line in which the valve is incorporated, as will hereinafter be more fully described, for the present invention makes renewal of packings a simple matter which may be carried out in a safe and efficient way without disturbing the position of the plug in its casing.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a side elevation of a valve embodying the present invention, one lateral half of the valve being shown in central section in the interest of clearness.

Figure 2 is an end view of the valve shown in Figure 1 with one lateral half of the valve also shown in central section.

Figure 3 is a plan view of the valve shown in Figures 1 and 2.

Figure 4 is a fragmental perspective view showing details of indicating devices incorporated in the construction.

Figure 5 is a fragmental central section of a modified form of construction.

The present invention may be incorporated either in straight-through valves or two, three or four way cocks and in valves embodying one or more tiers of ports, but, for the purpose of illustration, I have chosen to show a simple straight-through valve. As shown the valve embodies a casing 1 having alined passages 2 terminating in flanges 3 to incorporate the valve in a line. The valve has a removable seat 4 which may conveniently be of bronze, stainless steel or the like, although this seat may be omitted if desired. The plug 5 is shaped to properly cooperate with the seat and both the plug and the seat are in practice preferably made with a relatively fine taper as the valve of the present invention will properly allow of this design. The plug passage 6 is adapted to aline with the passages 2 of the casing to allow of the passage of fluid through the valve or said plug may be turned through 90 degrees to shut off the flow.

The top of the casing is closed by a bonnet 7 and the valve stem 8 passes centrally through the bonnet and has a packing gland 9 with associated packing 10. With the gland cooperates a gland yoke 11 adapted to adjust the gland through manipulation of gland nuts 12, associated with studs 13 tapped into the bonnet.

Threaded into the top of the casing 1 are a pair of standards 14, rigid with the housing and are locked in place by lock nuts 15. The standards extend upwardly in parallel relation through holes in the bonnet and are threaded with an oversized thread to receive clamping nuts 16 which serve to secure the bonnet to the casing. A gasket 17 is interposed between the bonnet and the housing and bears on the upper edge of the removable seat 4 to hold the seat in position and form a tight joint between the housing and the bonnet. The standards 14 extend well above the bonnet and carry a yoke 18, the upper end of the standards being reduced and threaded to pass through the yoke with shims 19 to permit of adjustment and nuts 20 bind the yoke to the standards.

The yoke is provided with a central opening, threaded as indicated at 21, to cooperate with the threaded outer periphery of a differential ring 22, the inner periphery of which is also threaded at 23 to cooperate with a stator nut 24 which has radially extending arms 25, bifurcated to straddle the standards 14.

The valve stem extends upwardly from the plug 5, through the gland and packing and through the stator nut 24, but it is reduced in diameter below the stator nut to form a shoulder 26 on which rests a plate 27, locked against rotation to the valve stem and provided with an upstanding pointer 28 adapted to cooperate with legends "Closed" and "Open" on the opposite faces of the stator nut. The plate 27 is so positioned with reference to the valve stem that the pointer 28 indicates the position of the passage 6 of the plug, so that when the pointer is juxtaposed with "Open", the plug will be in the open straight through position of Figure 1 whereas, when the pointer is juxtaposed with "Closed", the plug will be in a 90° relation to this position, i. e., in port-closing position. Thus the operator can see at a glance at the pointer whether or not the valve is open or closed and there can be no question about it.

The valve stem 8 is further reduced at the upper face of the stator nut to provide a shoulder 29 and on this shoulder rests a flanged sleeve 30 on the upper end of which and on a shoulder formed by a further reduction in the diameter of stem 8 is seated a male coupling 31 locked to the valve stem against rotation by a nut 32. The connection between the coupling 31 and the valve stem is preferably a squared connection, so that there is a positive lock against relative rotation between these parts. A grease cup 33 is shown associated with the top of the valve stem and the valve stem is provided interiorly with appropriate ducts (not shown) to feed the lubricant therefrom to the operating parts of the valve.

By this construction the stator nut is secured against movement longitudinally of the valve stem and must move with the stem in this direction, but the valve stem is free to rotate with respect to the stator nut.

The differential ring 22 is, as previously stated, threaded on both its inner and outer peripheries, but the threads of these peripheries are of different pitch. I do not restrict myself to particular pitches but I find it convenient to make the external thread a four pitch and the internal thread a 4½ pitch, so that, when the differential ring is rotated, the differential action which results will bring about longitudinal movement of the stator nut in accordance with a 40 pitch thread, so as to give a relatively slow movement with the application of great power.

Rotary movement is adapted to be imparted to the differential ring by a handle 34 having radially extending arms, the ends of which carry knobs 35 whereby the handle may be readily manipulated. The handle has a central opening having a sliding fit on the sleeve 30 between its flange and the male coupling 31, so that the handle is freely rotatable on the sleeve 30 as well as longitudinally movable thereon without tilting. The handle is provided with an annular series of holes 36 spaced on the same radius from the axis of the valve stem and both the differential ring and the male coupling 31 are provided with pins or dogs 37 and 38, respectively, adapted selectively to be engaged with the openings 36, to render either of these parts responsive to the operations of the handle.

Thus, if it is assumed that the plug is seated firmly on the seat 4, the handle is first brought into the position shown in Figure 1 to bring the holes 36 in position to receive the pins 37. In this position, the handle will be locked to the differential ring, and if the handle is now rotated, in a counterclockwise direction, it will rotate the differential ring in a like direction and will, through a 40 pitch, elevate the stator nut, carrying with it the valve plug 5, so that said plug is unseated.

Definite indication of the internal operations is provided for by an indicator hand 39, the details of which are shown in Figure 4. This hand is pivoted to loosely revolve on a pin 40 which passes through a boss 41 at one end of the yoke 18 and is held in place thereon by a nut 42 as shown. A spring 43 encircles the pin 40 and its ends are offset to enter perforations 44 and 45 in the yoke and pointer respectively, so as to bias the pointer to rotate in a counterclockwise direction. The pointer may be duplicated at opposite faces of the yoke, so that an indication may be had from either side of the valve. Mounted on one of the forked arms 25 of the stator nut 24 is an adjusting screw 46, so positioned as to act upon the pointer 39 off center and this adjusting screw may be locked in adjusted position by a set screw 47.

The parts are so adjusted that when the plug 5 is seated the pointer 39 will point to the word "Tight" on the yoke and as the stator nut is elevated, incident to the lifting or unseating of the plug, the adjusting screw 46 will push up the pointer, so that by the time the plug is fully unseated, the pointer will point to the word "Loose" on the yoke as will be clearly apparent from Figure 1. Thus, as the operator manipulates the handle, he can watch the pointer and see exactly what is going on and can accurately determine when the plug is unseated.

After the plug has been unseated or brought into "Loose" position, the handle 34 is bodily rectilinearly moved in an upward direction on the valve stem, so as to disengage holes 36 from pins 37 and engage the holes 36 with the pins 38 of the male coupling 31, so that through the turning of the handle the valve stem and the plug may be rotated with the latter free from its seat to open or close the valve as desired, during which operation the parts are freely rotatable without friction between the plug and its seat and without interference with or actuating the plug reciprocating means. The position of the passage 6 of the plug will be indicated by the pointer 28, as hereinbefore described, and by the pointers 48 of Figure 3 which point in the same direction as the passage 6. The direction of rotation for the loosening and tightening movements is indicated by the arrows 49 shown in Figure 3.

After the plug has been adjusted to the desired position, the handle is moved from interlocked relation with the coupling 31 into interlocked relation with respect to the differential ring and is thereupon manipulated to again lower the plug into seated relation with respect to the valve, the accomplishment of which will be indicated by the pointer 39 which will thereupon point to the word "Tight". It will thus be apparent that the condition of the plug will be at all times manifest to the operator through observation of the appropriate pointers and there will never be any question in his mind as to the exact condition of the parts.

Inasmuch as the longitudinal shifting of the plug on to and off of its seat is accomplished under considerable power, the taper of the plug may be made relatively fine to hold high pressures and yet permit of the operation of the parts without appreciable manual exertion.

It will also be apparent that the structure described obviates the necessity of shutting down the line in which the valve is incorporated to repack the gland for the gland and its operating parts are entirely independent of the operating parts of the plug. Thus the plug may be held tightly to its seat, while the nuts 12 of the gland yoke 11 are loosened to permit of re-packing, or the stem may be even re-packed while the plug is in elevated position and free from its seat, for the annular channel 50 at the top of the plug will be engaged by a complementary annular protuberance on the interior of the bonnet to form a relatively close seal at this point, independently of the gland and packing.

In the construction of Figures 1–4, the plug is moved to and from its seat through a differential ring. In Figure 5, however, this differential ring is omitted and a nut 51, freely rotatable on the valve stem, is threaded for direct cooperation with the threads of the yoke 18. The structure is otherwise the same as in the preceding figures, except that the increased pitch is not present in the construction of Figure 5.

An important advantage of the present invention over prior constructions is the marked simplicity of the arrangement described. The parts are so constructed that there is practically nothing to get out of order and the construction is thoroughly reliable under all conditions. This operation is so simple that it does not require any particular degree of skill for its manipulation and the indicating means are such as to effectually safeguard the valve against undue strain which is not infrequently placed on valves by operators as a precautionary measure in order that the operator may be sure that the valve is left in the condition desired. In this connection the legends "Loose" and "Tight" on the yoke constitute a dial over which the indicating member 39 operates, while the legends "Closed" and "Open" on the stator nut also constitute a dial with which the pointer 28 cooperates. In practice these legends may be other than those specified or graduations, such as are frequently found on the dials, may be used in lieu thereof.

The present invention does not greatly change the conventional valve casing construction. The operating parts are exteriorly of the casing and outside of the bonnet and constitute, in effect, adjuncts to a valve of substantially conventional construction. All these operating devices are in full view and may be readily inspected without dismantling any part. The operations are carried out through the employment of a single handle movable alternately along a rectilinear path into either of two positions which are definite and predetermined, so that it is actually impossible for the uninitiated to operate the valve improperly.

The foregoing detailed description sets forth the invention in its preferred practical forms, but the invention is to be understood as fully commensurate with the appended claims.

The invention described herein may be manufactured and used by or for the Government of the United States of America for governmental purposes without the payment of any royalties thereon or therefor.

Having thus fully described the invention, what I claim as new and desire to secure by Letters Patent is:

1. A plug valve comprising a casing, a plug mounted for axial and rotary movement within the casing and having an operating stem, rotary means operatively connected with the stem for imparting axial movement thereto to unseat and reseat the plug, an operating device mounted on the stem for imparting rotary movement to the plug, and an operating handle slidably and rotatably mounted on the plug stem between said rotary means and said operating device and adapted for engagement with either said rotary means or said operating device to impart successive axial and rotary movements to the stem and plug.

2. A plug valve comprising a casing, a plug mounted for axial and rotary movement within the casing and having an operating stem projecting through the casing, an internally screw-threaded yoke mounted on the casing through which the stem projects, an externally screw-threaded member sleeved on the stem and held against axial movement thereon, and having its screw-thread operatively in engagement with the screw-thread of the yoke, a clutch member fixed on the stem, and an operating handle slidably and rotatably mounted on the stem and adapted to operatively engage with either said screw-threaded member or said clutch member to impart successive axial and rotary movements to the stem and plug.

3. A plug valve comprising a casing, a plug mounted for axial and rotary movement within the casing and having an operating stem projecting through the casing, an internally screw-threaded yoke mounted on the casing through which the stem projects, an externally screw-threaded collar within the yoke and sleeved on the stem for imparting axial movement thereto, means for holding said collar against rotation, a rotatable internally and externally screw-threaded ring between said yoke and collar having its threads in operative engagement with the threads of the yoke and collar, a clutch member fixed on the stem for imparting rotary movement thereto, an operating handle slidably and rotatably mounted on the stem between said ring and clutch member for engaging either said ring or clutch member, and means on the handle for operatively engaging said ring or clutch member for imparting successive axial and rotary movements to the stem and plug.

EDWIN C. McFARLANE.